US009715641B1

(12) United States Patent
Kwatra et al.

(10) Patent No.: US 9,715,641 B1
(45) Date of Patent: Jul. 25, 2017

(54) LEARNING HIGHLIGHTS USING EVENT DETECTION

(71) Applicant: Google Inc., Mountain View, CA (US)

(72) Inventors: Vivek Kwatra, Santa Clara, CA (US); Ullas Gargi, Los Altos, CA (US); Mehmet Emre Sargin, Mountain View, CA (US); Henry Hao Tang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 20 days.

(21) Appl. No.: 14/585,075

(22) Filed: Dec. 29, 2014

Related U.S. Application Data (63) Continuation of application No. 13/314,837, filed on Dec. 8, 2011, now Pat. No. 8,923,607.

(60) Provisional application No. 61/421,145, filed on Dec. 8, 2010.

(51) Int. Cl.
  G06K 9/00 (2006.01)
  G06K 9/62 (2006.01)
  G06N 99/00 (2010.01)
  G06K 9/46 (2006.01)

(52) U.S. Cl.
  CPC ....... *G06K 9/6256* (2013.01); *G06K 9/00536* (2013.01); *G06K 9/46* (2013.01); *G06K 9/4647* (2013.01); *G06N 99/005* (2013.01)

(58) Field of Classification Search
  CPC .......... G06K 9/00711; G06K 9/00724; G06K 9/00751; G06K 9/00624–9/00845; H04N 21/8456; G06F 17/30843
  See application file for complete search history.

(56) References Cited

U.S. PATENT DOCUMENTS

| | | | |
|---|---|---|---|
| 5,828,809 A * | 10/1998 | Chang | G06F 17/30787 348/E17.003 |
| 6,072,542 A * | 6/2000 | Wilcox | G06K 9/00711 348/700 |
| 6,744,922 B1 | 6/2004 | Walker | |
| 6,754,389 B1 | 6/2004 | Dimitrova et al. | |
| 6,763,069 B1 | 7/2004 | Divakaran et al. | |
| 6,774,917 B1 * | 8/2004 | Foote | G06F 17/30814 707/E17.028 |
| 6,813,313 B2 * | 11/2004 | Xu | G06K 9/00711 348/399.1 |
| 7,302,451 B2 | 11/2007 | Radhakrishnan et al. | |
| 7,313,269 B2 | 12/2007 | Xie et al. | |
| 7,359,836 B2 | 4/2008 | Wren et al. | |
| 7,474,698 B2 | 1/2009 | Pan et al. | |
| 7,545,954 B2 | 6/2009 | Chan et al. | |

(Continued)

OTHER PUBLICATIONS

Li et al., "A Hidden Markov Model Framework for Traffic Event Detection Using Video Features", IEEE International Conference on Image Processing (CIP), 2004, pp. 2901-2904.

*Primary Examiner* — Aaron W Carter
(74) *Attorney, Agent, or Firm* — Byrne Poh LLP (57) ABSTRACT

A highlight learning technique is provided to detect and identify highlights in sports videos. A set of event models are calculated from low-level frame information of the sports videos to identify recurring events within the videos. The event models are used to characterize videos by detecting events within the videos and using the detected events to generate an event vector. The event vector is used to train a classifier to identify the videos as highlight or non-highlight.

19 Claims, 5 Drawing Sheets

(56) References Cited

U.S. PATENT DOCUMENTS

| | | | |
|---|---|---|---|
| 7,991,715 B2* | 8/2011 | Schiff | G06Q 30/02 706/20 |
| 8,233,708 B2 | 7/2012 | Yamauchi et al. | |
| 8,284,258 B1 | 10/2012 | Cetin et al. | |
| 8,396,286 B1* | 3/2013 | Aradhye | G06K 9/66 382/159 |
| 8,452,778 B1* | 5/2013 | Song | G06K 9/00711 704/233 |
| 8,683,521 B1* | 3/2014 | Gargi | H04N 21/4826 725/44 |
| 8,819,024 B1* | 8/2014 | Toderici | G06F 17/30731 707/740 |
| 8,923,607 B1* | 12/2014 | Kwatra | G06K 9/00724 382/159 |
| 2002/0080162 A1* | 6/2002 | Pan | G06F 17/30811 715/723 |
| 2003/0033347 A1* | 2/2003 | Bolle | G06F 17/30253 718/107 |
| 2003/0058268 A1* | 3/2003 | Loui | G06F 17/30802 715/719 |
| 2003/0058340 A1 | 3/2003 | Lin et al. | |
| 2003/0076448 A1* | 4/2003 | Pan | G06F 17/3079 348/589 |
| 2003/0103565 A1* | 6/2003 | Xie | G06F 17/30799 375/240.08 |
| 2004/0017389 A1* | 1/2004 | Pan | G06F 17/30787 715/723 |
| 2004/0113933 A1 | 6/2004 | Guler | |
| 2004/0130567 A1* | 7/2004 | Ekin | A63B 24/0003 715/723 |
| 2004/0167767 A1* | 8/2004 | Xiong | G10L 25/00 704/1 |
| 2004/0205482 A1* | 10/2004 | Basu | G06F 17/241 715/201 |
| 2005/0125223 A1 | 6/2005 | Divakaran et al. | |
| 2005/0131869 A1 | 6/2005 | Xie et al. | |
| 2005/0160457 A1* | 7/2005 | Rui | G06F 17/30743 725/45 |
| 2005/0190975 A1 | 9/2005 | Porikli et al. | |
| 2005/0249412 A1* | 11/2005 | Radhakrishnan | G06F 17/30787 382/173 |
| 2005/0251532 A1* | 11/2005 | Radhakrishnan | G06F 17/30787 |
| 2005/0257151 A1* | 11/2005 | Wu | G06F 17/30852 715/716 |
| 2005/0285937 A1* | 12/2005 | Porikli | G06K 9/00335 348/143 |
| 2005/0286774 A1* | 12/2005 | Porikli | G06K 9/00335 382/225 |
| 2006/0053342 A1* | 3/2006 | Bazakos | G06K 9/00335 714/37 |
| 2006/0059120 A1 | 3/2006 | Xiong et al. | |
| 2006/0149693 A1 | 7/2006 | Otsuka et al. | |
| 2006/0221184 A1* | 10/2006 | Vallone | G08B 13/19693 348/155 |
| 2007/0010998 A1* | 1/2007 | Radhakrishnan | G06K 9/00711 704/211 |
| 2007/0101269 A1* | 5/2007 | Hua | G06F 17/30811 715/723 |
| 2007/0112583 A1* | 5/2007 | Hua | G06K 9/00711 382/229 |
| 2007/0124678 A1* | 5/2007 | Agnihotri | G06F 17/30796 715/720 |
| 2007/0162924 A1* | 7/2007 | Radhakrishnan | G06K 9/00718 725/18 |
| 2007/0255755 A1* | 11/2007 | Zhang | G06F 17/30799 |
| 2007/0279490 A1* | 12/2007 | Zhou | G06K 9/00771 348/143 |
| 2007/0292106 A1* | 12/2007 | Finkelstein | G11B 27/28 386/241 |
| 2007/0294716 A1 | 12/2007 | Jeong et al. | |
| 2008/0138029 A1* | 6/2008 | Xu | G06F 17/30787 386/228 |
| 2008/0193016 A1 | 8/2008 | Lim et al. | |
| 2008/0193017 A1* | 8/2008 | Wilson | G06N 99/005 382/190 |
| 2008/0215318 A1 | 9/2008 | Zhang et al. | |
| 2009/0154806 A1* | 6/2009 | Chang | G06F 17/30781 382/173 |
| 2009/0297032 A1* | 12/2009 | Loui | G06F 17/30256 382/195 |
| 2009/0299999 A1* | 12/2009 | Loui | G06F 17/30256 |
| 2010/0005485 A1 | 1/2010 | Tian et al. | |
| 2010/0123830 A1* | 5/2010 | Vunic | G06K 9/00711 348/700 |
| 2010/0124378 A1* | 5/2010 | Das | G06F 17/30247 382/225 |
| 2010/0177969 A1* | 7/2010 | Huang | H04N 21/64322 382/224 |
| 2010/0246944 A1* | 9/2010 | Yang | G06F 17/30253 382/165 |
| 2010/0278419 A1* | 11/2010 | Suzuki | G06F 17/30787 382/155 |
| 2011/0026825 A1* | 2/2011 | Chaudhuri | G06K 9/00751 382/170 |
| 2011/0044536 A1* | 2/2011 | Cobb | G06K 9/46 382/165 |
| 2011/0047163 A1* | 2/2011 | Chechik | G06F 17/30781 707/741 |
| 2011/0050897 A1* | 3/2011 | Cobb | G06K 9/00771 348/143 |
| 2011/0099195 A1* | 4/2011 | Patwardhan | G06F 17/3084 707/769 |
| 2011/0255005 A1 | 10/2011 | Myoga et al. | |
| 2012/0087588 A1 | 4/2012 | Carter | |
| 2012/0109901 A1 | 5/2012 | Mase | |
| 2014/0168517 A1 | 6/2014 | Petajan et al. | |
| 2016/0012296 A1* | 1/2016 | Xing | G06K 9/00765 386/241 |
| 2016/0070962 A1* | 3/2016 | Shetty | G06K 9/00718 382/225 |

\* cited by examiner

LEARNING HIGHLIGHTS USING EVENT DETECTION

CROSS REFERENCE TO RELATED APPLICATIONS

This is a continuation of U.S. application Ser. No. 13/314,837, filed on Dec. 8, 2011, which claims the benefit of Provisional Application No. 61/421,145, filed on Dec. 8, 2010, each of which is hereby incorporated by reference.

BACKGROUND

1. Field of Art

The present disclosure generally relates to automatically identifying video highlights.

2. Background

Sports videos are punctuated by moments of excitement. For many sports, the exciting moments are scattered throughout a full video of the game which typically includes primarily uninteresting material. For every home run there are balls and strikes. For every touchdown or interception, unproductive running plays and incomplete passes. Soccer and hockey can have entire games with just a few goals. Most viewers just want to get these interesting and exciting portions (herein "sports video highlights"), without having to watch an entire game.

SUMMARY

A highlight learning module trains highlight classifiers to identify highlights in videos based on event vectors which characterize the videos according to detected events. To identify the events, features are extracted from the videos on a frame basis. The features are used to identify events within the video using event models trained in an unsupervised manner to identify recurring events within the videos. Using the event framework, the training videos are transcribed into a series of events and event vectors are constructed for the training videos to train a classifier according to the event vectors. Since the event framework is developed with an unsupervised assessment of the low-level features, the only supervision which need be used in this technique is to designate the video at a high level for the training sets as highlight or non-highlight. Moreover, the low-level feature and event detection framework enables a system applicable to a wide variety of sports videos.

The highlight learning module is used to classify video clips using the trained classifiers. The highlight learning module receives a video, or portion of a video to be classified. The highlight learning module extracts features from the video or portion thereof to match the features used to train the event models. The extracted features from the video clips are transcribed by the event models. An event vector is created for the transcribed events, and the video is classified using the event vector applied to the highlight classifier to determine if the video is a highlight according to this highlight classifier. The same event vector for a video can be classified using several highlight classifiers which can determine whether the video belongs to any of the highlight types.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

System Architecture

Figure 1:
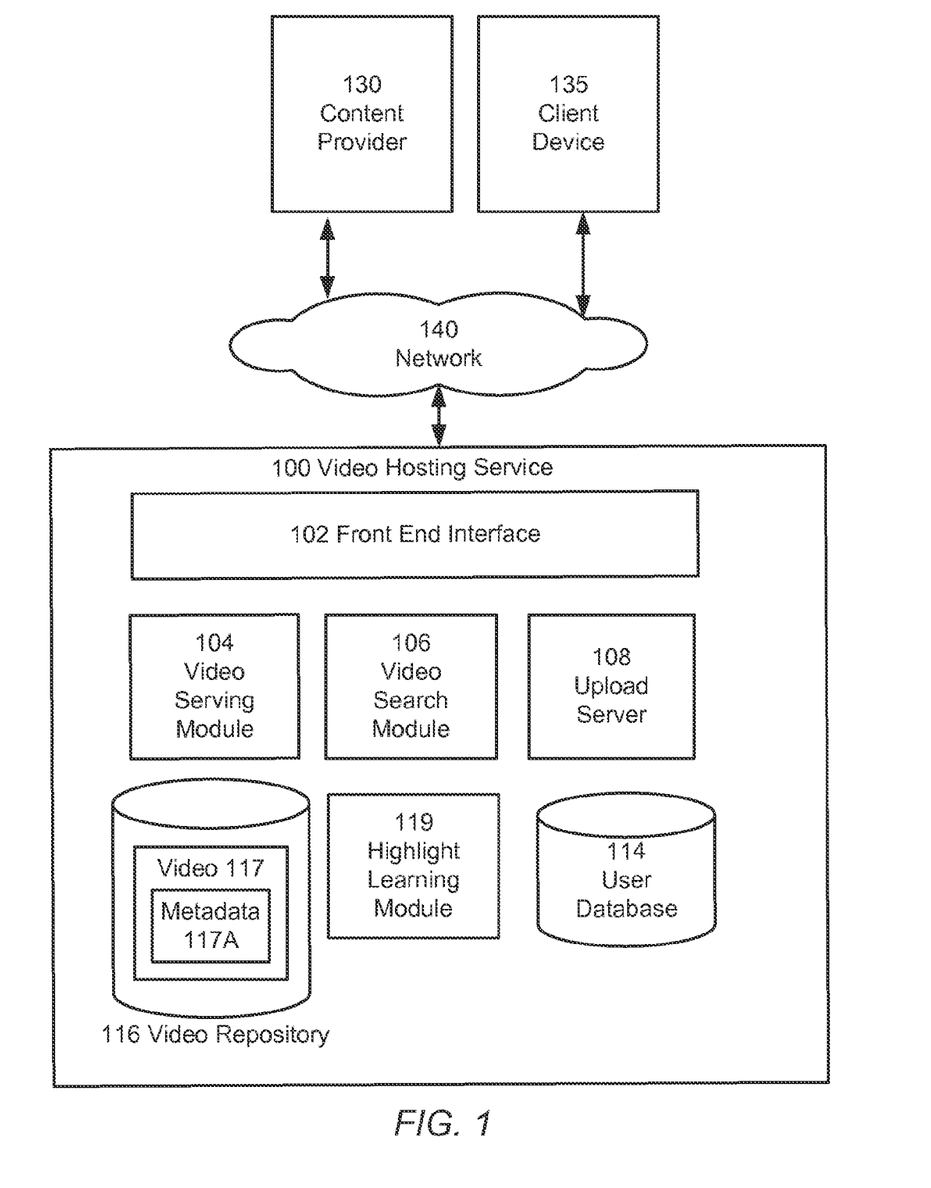
FIG. 1 is a block diagram of a video hosting service in which highlight learning can be employed according to an embodiment.

FIG. 1 is a block diagram of a video hosting service 100 in which highlight learning with event modeling can be employed, according to one embodiment. The video hosting service 100 represents a system such as that of YOUTUBE that stores and provides videos to clients such as the client device 135. The video hosting site 100 communicates with a plurality of content providers 130 and client devices 135 via a network 140 to facilitate sharing of video content between users. Note that in FIG. 1, for the sake of clarity only one instance of content provider 130 and client 135 is shown, though there could be any number of each. The video hosting service 100 additionally includes a front end interface 102, a video serving module 104, a video search module 106, an upload server 108, a user database 114, and a video repository 116. Other conventional features, such as firewalls, load balancers, authentication servers, application servers, failover servers, site management tools, and so forth are not shown so as to more clearly illustrate the features of the video hosting site 100. One example of a suitable site 100 is the YOUTUBE website, found at www.youtube.com. Other video hosting sites can be adapted to operate according to the teachings disclosed herein. The illustrated components of the video hosting website 100 can be implemented as single or multiple components of software or hardware. In general, functions described in one embodiment as being performed by one component can also be performed by other components in other embodiments, or by a combination of components. Furthermore, functions described in one embodiment as being performed by components of the video hosting website 100 can also be performed by one or more client devices 135 in other embodiments if appropriate.

Client devices 135 are computing devices that execute client software, e.g., a web browser or built-in client application, to connect to the front end interface 102 of the video hosting service 100 via a network 140 and to display videos. The client device 135 might be, for example, a personal computer, a personal digital assistant, a cellular, mobile, or smart phone, or a laptop computer.

The network 140 is typically the Internet, but may be any network, including but not limited to a LAN, a MAN, a WAN, a mobile wired or wireless network, a cloud computing network, a private network, or a virtual private network. Client device 135 may comprise a personal computer or other network-capable device such as a personal digital assistant (PDA), a mobile telephone, a pager, a television "set-top box," and the like.

Conceptually, the content provider 130 provides video content to the video hosting service 100 and the client 135 views that content. In practice, content providers may also be content viewers. Additionally, the content provider 130 may be the same entity that operates the video hosting site 100.

The content provider 130 operates a client device to perform various content provider functions. Content provider functions may include, for example, uploading a video file to the video hosting website 100, editing a video file stored by the video hosting website 100, or editing content provider preferences associated with a video file.

The client 135 is a device operating to view video content stored by the video hosting site 100. Client 135 may also be used to configure viewer preferences related to video content. In some embodiments, the client 135 includes an embedded video player such as, for example, the FLASH player from Adobe Systems, Inc. or any other player adapted for the video file formats used in the video hosting website 100. Note that the terms "client" and "content provider" as used herein may refer to software providing both client and content providing functionality, to hardware on which the software executes. A "content provider" also includes the entities operating the software and/or hardware, as is apparent from the context in which the terms are used.

The upload server 108 of the video hosting service 100 receives video content from a client devices 135. Received content is stored in the video repository 116. In response to requests from client devices 135, a video serving module 104 provides video data from the video repository 116 to the clients 135. Client devices 135 may also search for videos of interest stored in the video repository 116 using a video search module 106, such as by entering textual queries containing keywords of interest. Front end interface 102 provides the interface between client 135 and the various components of the video hosting site 100.

In some embodiments, the user database 114 is responsible for maintaining a record of all registered users of the video hosting server 100. Registered users include content providers 130 and/or users who simply view videos on the video hosting website 100. Each content provider 130 and/or individual user registers account information including login name, electronic mail (e-mail) address and password with the video hosting server 100, and is provided with a unique user ID. This account information is stored in the user database 114.

The video repository 116 contains a set of videos 117 submitted by users. The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as MPEG-2, MPEG-4, WebM, WMV, H.263, H.264, and the like. In addition to their audiovisual content, the videos 117 further have associated metadata 117A, e.g., textual metadata such as a title, description, and/or tags.

The video hosting service 100 further comprises a highlight learning module 119 that trains accurate video classifiers for a set of highlights. The trained classifiers can then be applied to a given video to automatically determine whether the video is a highlight. In addition, the highlight learning module 119 can separate a longer video into component parts and identify the portion (or portions) that contain a highlight. If the portion is identified as a highlight, the portion can be made an individual video alone. For example, a user may submit a new video, and the highlight learning module 119 can automatically determine if the video or some portion(s) thereof is a highlight. The highlight status of a video can be used to update a video's metadata 117A. The highlight learning module 119 is now described in greater detail.

Highlight Learning Module

Figure 2:
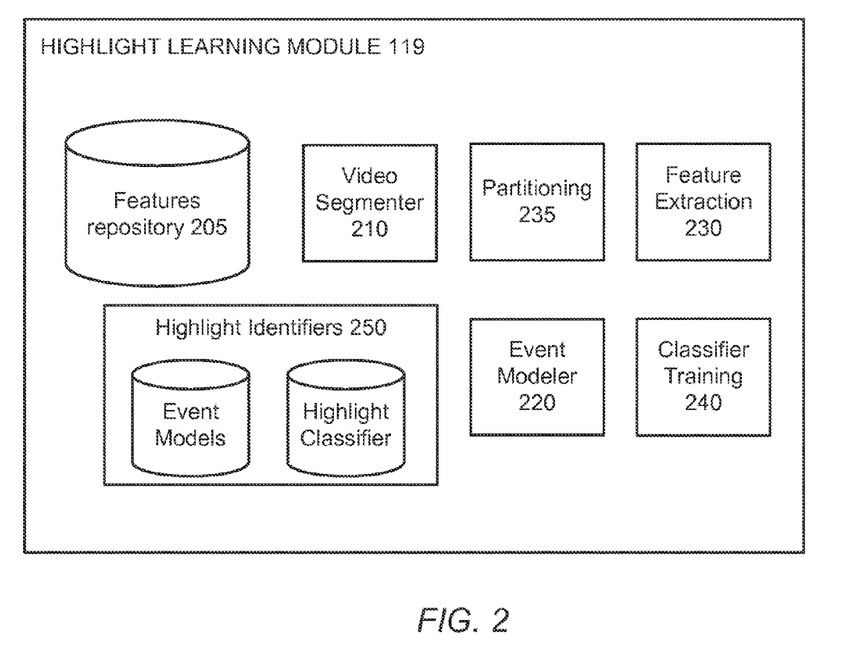
FIG. 2 illustrates the various components of a highlight learning module used in the video hosting service according to an embodiment.

FIG. 2 illustrates the various components of the highlight learning module 119, according to one embodiment. The highlight learning module 119 comprises various modules to model video events, derive video features, train classifiers for highlights, and the like. In one embodiment, the highlight learning module 119 is incorporated into an existing video hosting service 100, such as YOUTUBE.

The highlight learning module 119 has access to the video repository 116 of the video hosting service 100. The highlight learning module 119 additionally comprises a features repository 205 that stores, for videos of the video repository 116, associated sets of features that characterize the videos with respect to one or more types of visual or audio information, such as color, motion, and audio information. The features of a video 117 are distinct from the raw content of the video itself and are derived from it by a feature extraction module 230. In one embodiment, the features are stored as a vector of values, the vector having the same dimensions for each of the videos 117 for purposes of consistency. In one embodiment, the features repository 205 maintains features for the videos identified as pertaining to sports.

The highlight learning module 119 further comprises highlight identifiers 250 that describe various types of highlights which can be classified by the highlight learning module 119. For example, different highlight videos can be learned based on different types of sports, or can be learned based on different definitions of a "highlight" for a sport. For example, if someone is interested exclusively in a soccer goal, the highlight training can be performed by marking a training set which includes as positives the goal clips as highlights. The highlight identifiers 250 comprise an event model as well as highlight classifiers.

The event models are used to detect events within a video clip. These events may or may not be semantically meaningful at a high level, but represent a coherent patterns of feature data in the video clips. The events identified in a particular video clip are chosen from a universe of event models. The event models are determined and refined by an event modeler 220. Each event type can appear several times or not at all within a particular video clip. For example, conceptually a baseball event model may have an event of a batter preparing, and another event of a pitcher throwing a ball, which are associated with characteristic patterns of features over time. An individual baseball clip may have several batter preparation events, several pitcher throwing a ball events, and a no "hit" events. The events are learned in an unsupervised manner, and therefore are not necessarily semantically meaningful. For example, a detected event type could merely be a momentary close-up on a player.

The highlight identifiers 250 also include highlight classifiers. The highlight classifiers are used to classify video clips according a highlight using an event vector constructed from the events detected from the video clip. The highlight classifier is a function that outputs a score representing a degree to which the events associated with the video indicate that the particular highlight applies to the video, thus serving as a measure indicating whether the video is a highlight video. The highlight classifiers may output a confidence range for the highlight determination, or may output a boolean value for the highlight. Each highlight classifier can be used to identify a different type of highlight. The classifiers can be trained according to different definitions of what constitutes a highlight. For example, one highlight for a baseball game could be defined as any hit, while another could be defined as any run, while another might be on an out. This can be accomplished by changing which videos are included in a positive highlight training set. As a result, different portions of a baseball game may be classified as a "highlight" depending on which highlight classifier is used.

Feature Extraction

The features extracted using the feature extraction module 230 in one embodiment are visual low-level frame-based features. For example, one embodiment uses a color histogram and one embodiment uses histogram of oriented gradients to extract features from frames in a video, though other frame-based features can be used. The features extracted are collected on a per-frame basis and could comprise other frame-based features such as an identified number of faces or a histogram of oriented optical flow, and may comprise a combination of extracted features. Further features are extracted in other embodiments, such as a Laplacian-of-Gaussian (LoG) or Scale Invariant Feature Transform (SIFT) feature extractor, a color histogram computed using hue and saturation in HSV color space, motion rigidity features, texture features, filter responses (e.g. derived from Gabor wavelets), including 3D filter responses, edge features using edges detected by a Canny edge detector, gradiant location and orientation histogram (GLOH), local energy-based shape histogram (LESH), or speeded-up robust features (SURF). Additional audio features can also be used, such as volume, an audio spectrogram, or a stabilized auditory image. In order to reduce the dimensionality of these features while maintaining the discriminating aspects, the features are reduced. The feature reduction is performed in one embodiment using a learned linear projection using principal component analysis to reduce the dimensionality of the feature vectors to 50, or some other suitable number less than 100. Other embodiments can use additional techniques to reduce the number of dimensions in the feature vectors.

Video Set Partitioning

Partitioning module 235 partitions the videos 117 into different sets used for performing training of the classifiers 212. More specifically, the partitioning module 235 determines training and validation sets from the videos 117, where the training set is used for training the highlight identifiers 250 and the validation set is used to test the accuracy of the trained/learned identifiers 250. The partitioning module 235 also divides the videos of the training and validation sets into "positive" examples representative of a video highlight and "negative" examples which are not representative. In one embodiment, the designation of highlight or no-highlight is determined manually for the training and validation sets.

The training sets can also be determined on a per-classifier basis. That is, different training sets may be used for each different highlight classifier. In addition, the training set as a whole can be the same across highlight, while divisions among positive and negative training sets differ according to the highlight used. For example, a positive training set comprising a "hit" in baseball will train a classifier to identify hits, while a positive training set comprising a "walk" will train a classifier to identify walks. A positive training set can also be designated to include several such "types" of highlights (e.g. hits and walks).

Classifier Training

The highlight learning module 119 additionally comprises a classifier training module 240 that iteratively learns the highlight classifier based on the events from the positive and negative training sets identified by the event models. In one embodiment, the highlight classifier is a linear support vector machine (LSVM) which is trained to classify an input video event vector as either highlight or non-highlight. Other classification methods can be used, such as a logical regression or a boosting algorithm.

Event Modeling

Figure 3:
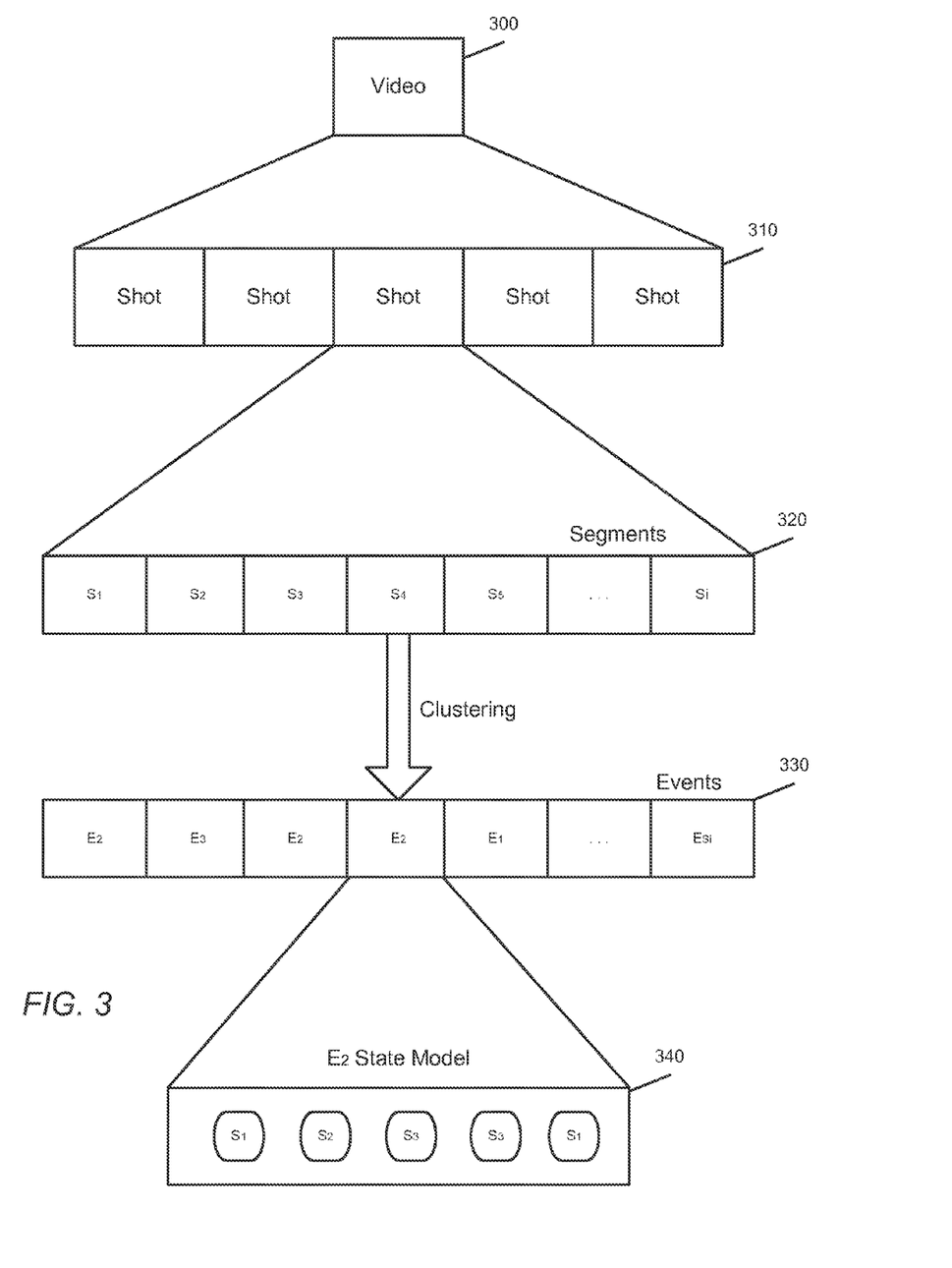
FIG. 3 is a detailed view of the event modeling components according to an embodiment.

A detailed view of the event modeling framework is shown in FIG. 3 according to an embodiment. This figure illustrates the conceptual framework for event modeling as well as the initialization for the initial event models. The initial event modeling and the event model refinement is performed on an unsupervised basis, and can be determined based on the extracted features alone.

A diarization process is used to initialize the event models, such that the videos are first separated into shots, then segmented into small sequential chunks of video, and the chunks are then clustered into initial event types. The event types themselves are composed of multiple possible states. This organization is shown in FIG. 3.

The video 300 is separated into several shots 310. Each shot 310 is an individual sequence of frames captured without interruption. The transition between one video shot to another shot can be determined by a shot boundary detection algorithm, for example using color histogram, edge changes, changes in pixel intensities, motion differences, or other features. Next, within each shot, the shot is separated into a selection of segments according to time. In one embodiment, the segments are chunks of 500 milliseconds of video. Since the segments are small discrete chunks within a single shot, we can assume the segments each correspond to an individual event.

Therefore, to develop a set of event designations, each training video is broken down into individual segments, each presumed to belong to an individual event. To develop an assignment of events to the individual segments, the segments in the entire training set are clustered using the feature vectors associated with each segment. The clustering in one embodiment is performed using a bottom-up hierarchical agglomerative clustering algorithm with the Ward's linkage function. This function specifies the distance between two clusters and is computed as the increase in the error sum of squares after fusing two clusters into a single cluster. The clustering can also be performed using a K-means clustering algorithm. The membership in each cluster is used to assign an event to the associated segments, and therefore the final number of clusters determines the number of events in the set of events. For any clustering algorithm, the number of clusters can be chosen by the designer or modified to fit the number of events which optimizes the highlight classification results. Generally, the number of clusters is within a range of 30-100. Using the clustered segments, each cluster is assigned an event designation (e.g. $E_1, E_2, \ldots E_n$), and the associated segments are assigned to an event 330. These identified events represent identifiable patterns of features of within the video content itself; some of these events may correspond to semantically meaningful action within the video (e.g., such as motions of a batter swinging) while others may have no specific high level semantic content. The clusters are used to identify initial event designations for the video clips. These event designations are used to develop event models to identify event sequences within video clips.

The event models can be developed using two different methods, Hidden Markov Modeling and Mixture Modeling.

Hidden Markov Modeling

In one embodiment, since the events are evolving patterns over time, each event is individually modeled as a group of states 330 using a hidden Markov model (HMM). As shown in this figure, the states of this instance of $E_2$ comprise several states which may repeat within the state model. As a result, the event models are a set of HMMs M, each $M_i$ associated with an event type $E_i$. Using the event designations 330, the set of models M are jointly trained using an embedded HMM training technique.

The embedded HMM training technique uses frequency and transition information for each HMM to train HMM identification. These statistics are calculated for each event by determining the frequency of each event and a transition matrix between the events. These statistics are measured globally across the set of events and across all event training videos. That is, the statistics determine the frequency, globally, of the occurrence of each event $E_1$-$E_n$. The transition matrix quantizes the transition frequency of each event to another event. For each event pair ($E_i$, $E_j$) the transition matrix determines the number of times the first state immediately precedes the second state within the group of event training designations. State order is relevant, for example the transition ($E_1$, $E_5$) is distinct from the transition ($E_5$, $E_1$).

The embedded HMM technique does not train each HMM in isolation (i.e. based only on the video frames/segments associated with the event). Rather, the HMMs are trained on the videos themselves. Each video clip is treated as a sequence of distinct events to be modeled by the group of HMMs. One method of conceptualizing this is that each HMM is a "super-state" for a "super-HMM," where the super-HMM models the video clips and therefore identifies a sequence of event HMMs within the video clip. In this way, the event HMMs are inter-connected and trained simultaneously. To accomplish this training, the initial event designations along with the transition frequency and transition matrix are used according to known embedded HMM training techniques. The embedded HMMs trained by this method result in an initial set of event models.

Once the clip HMMs are trained, in order to characterize the features of a video clip into a series of events using the event models, an expectation maximization model is used to identify the most likely sequence of events in the video clip. One embodiment uses the Viterbi algorithm to identify the maximum-likelihood path and thereby identify the events associated with the video clip features. Other expectation-maximization techniques can also be used.

Mixture Modeling

In another embodiment, the event models are developed using a mixture model, such as a Gaussian Mixture Model (GMM). Using a mixture model, the event state models 340 are not used. Instead, a Gaussian mixture model is trained using the features and the associated event designations 330. Stated another way, the initial event designations are used to train a GMM classifier to assign probable event membership to the features of a frame. Hence, the GMM classifies the features for a frame by assigning probabilities P for each possible event $P_i$. The probabilities can be calculated as a distance from the center of the cluster of features comprising each event. In this way, the probabilities can also be thought of as a distance "cost." The collection of probabilities associated with each possible event is stored as a vector: $P=\{P_1 \ldots P_n\}$.

The GMM assignment of features to an event can also be adjusted by using a cost matrix to model the costs of transitioning from one state to another. The cost matrix C indicates the costs to transition from each event to each other event. The cost matrix includes for each event an associated cost model $C_i$ for transitioning to each other event, such that the cost matrix C is the set of all event transition costs: $C=\{C_i \ldots C_n\}$. The cost model for each event $C_i$ is a vector representing the transition to each other event: $C_i=\{C_{i,1} \ldots C_{i,n}\}$. In order to smooth the event assignments and to reflect the high frequency of same-event transitions, in one embodiment the cost of transitioning from a state to itself is set to zero. The cost matrix can be derived from a probability matrix as discussed with respect to the HMM method above. The cost is set inversely to the probability that one state transitions to another (i.e. it is more costly to transition to a state which is more infrequent, and less costly to transition to a state which is more frequent). An example cost matrix is shown in Table 1:

TABLE 1

| Destination | Source | | | |
| --- | --- | --- | --- | --- |
| | $E_1$ | $E_2$ | $E_3$ | $E_4$ |
| $E_1$ | 0 | 1 | 5 | 3 |
| $E_2$ | 7 | 0 | 3 | 2 |
| $E_3$ | 1 | 2 | 0 | 1 |
| $E_4$ | 1 | 3 | 6 | 0 |

Each column in Table 1 indicates a cost function for a different source event, while the rows indicate the destination event. For example, the third column for $E_3$ would be the event transition costs $C_3$ from $E_3$ to each event $E_1$-$E_4$. The cost matrix C shown in table 1 is used adjust the frame-based probabilities P according to the likelihood of the associated transition. For example, if the prior frame was $E_3$, the probability vector P calculated from the next frame features is adjusted by the transition cost vector for the frame $C_3$. In an embodiment where the probabilities P are treated as costs, the final classification calculation for the GMM is F, where $F=P+C_i, =\{P_1+C_{i,1}, P_2+C_{i,2}, \ldots P_n+C_{i,n}\}$. In this way, the most likely next event in the sequence is the event with the lowest final cost.

The model F is used to identify events within a video clip using a GMM. Since this model includes a notion of state (the values for C depends on the previously-identified event and therefore introduces an element of sequential dependence), the identification of events in a video clip can be captured using an expectation-maximization model to determine the most-likely sequence of events. This describes the calculation of the event models and the identification by the event models of events within a video clip. The event models developed above were an initial pass based on clustering the events. The event models can be further refined with reference to FIG. 4.

Event Model Development and Refinement

Figure 4:
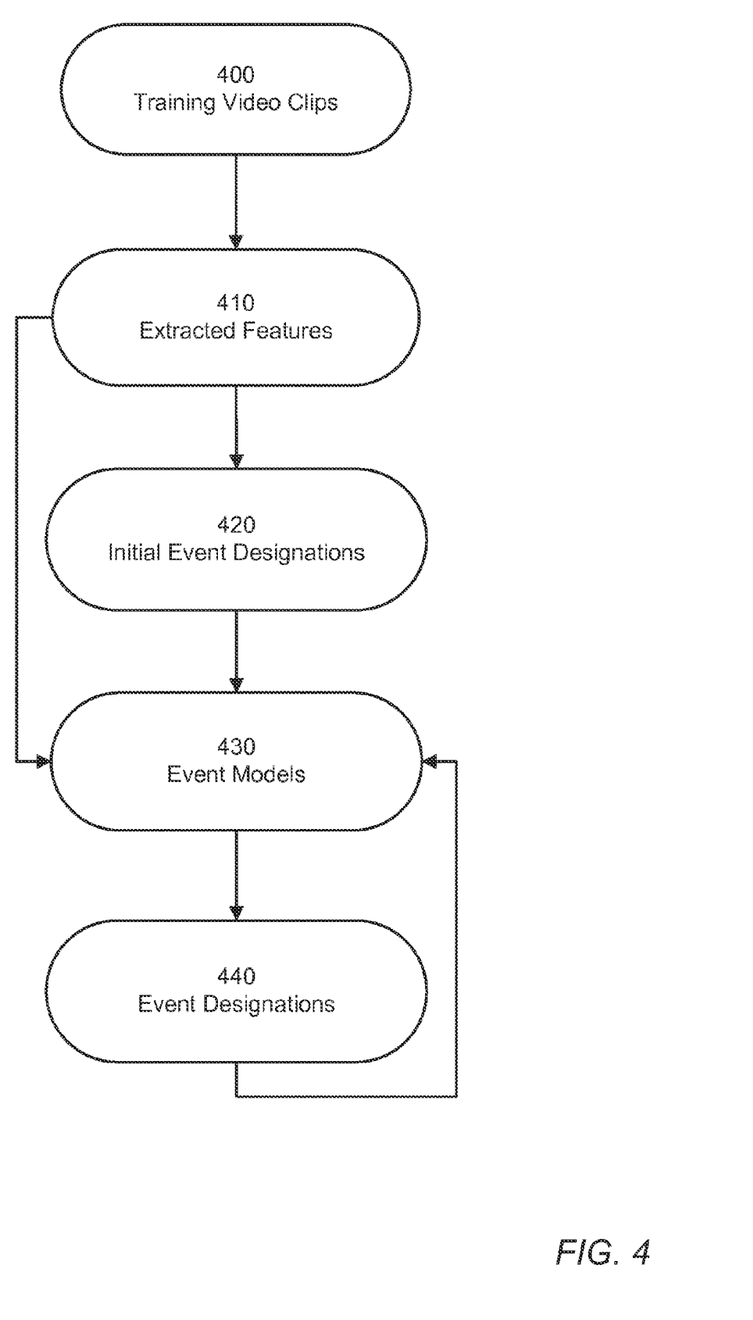
FIG. 4 is a data flow diagram showing iterative refinement of the event models.

FIG. 4 illustrates a data flow diagram showing iterative refinement of the event models, according to an embodiment. Using training video clips 400, the system obtains a set of extracted features 410 as described above. Next, the extracted features are clustered to develop initial event designations 420. The initial event designations used to develop event models 430.

Using the event models 430, the features extracted 410 from the training video clips 400 are input to re-designate the training set video clips into an event sequence by evaluating the most likely event sequence. As described, the event models in one embodiment are embedded HMMs, and the re-designation of the training set clips into an event sequence uses the Viterbi algorithm. In another embodiment, the event model is a GMM and the events are designated using an expectation maximization (EM) model. Using the training methods for the event model as described above, the current iteration of training set event designations is used to train a new set of event models. These new event models are applied to the training set to determine the next iteration of event designations.

The event models are then refined using the event designations 440. That is, the event models are recalculated using the model calculation strategy according to the event model chosen. In addition, the event modeling can take into account a cost function of transitioning from one event to another in order to smooth event transition frequency. The refined event models 430 can now be used as the final event models, or the event designations 440 is used to iteratively refine the event models 430, optionally to convergence. Using the event models, events are identified and transcribed within the video clips. The identified events are used as inputs to train highlight classifiers and as an input to classify the video using a trained highlight classifier. One set of event models can be used for event classification for a particular type of video, or several event models can be developed according to the training videos or the highlight classification needs.

Highlight Classification

Figure 5:
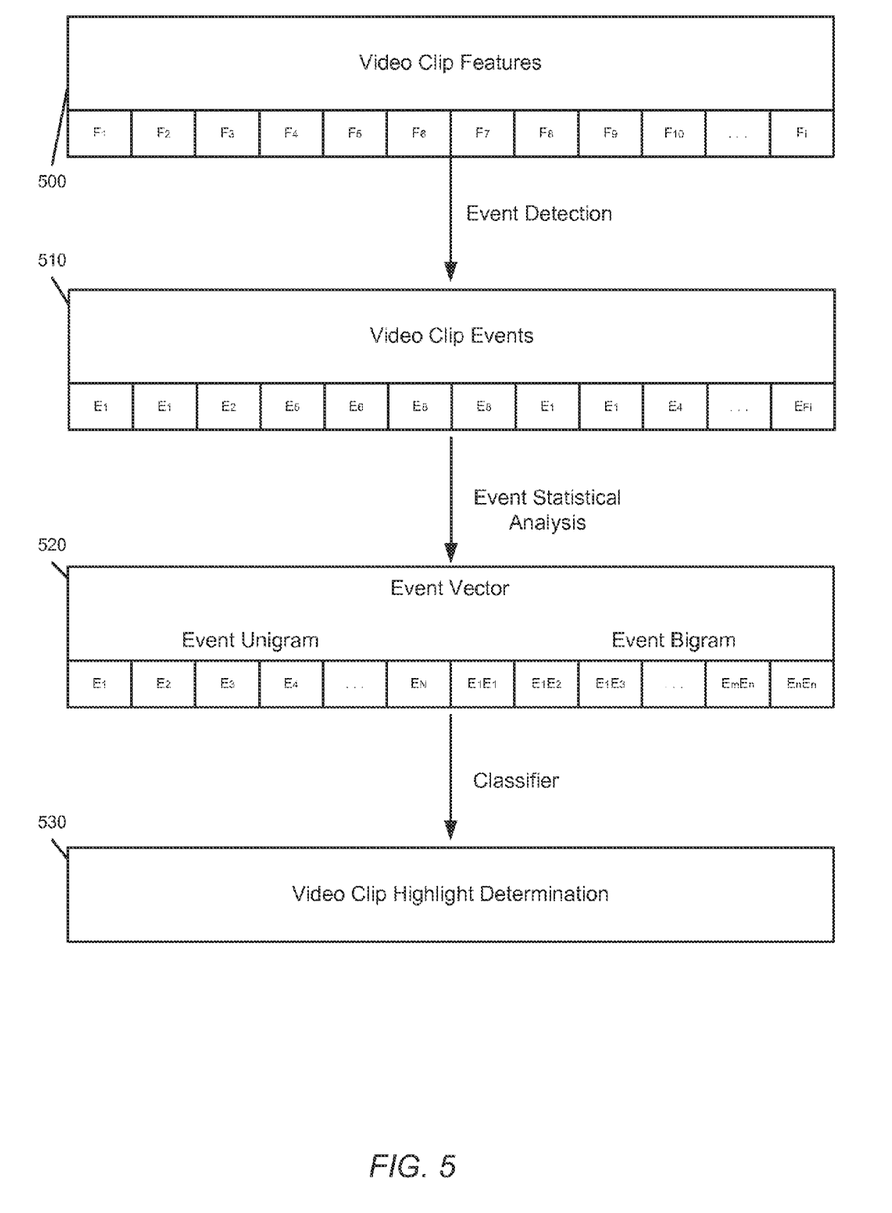
FIG. 5 presents an overview of highlight detection using event modeling according to an embodiment.

Referring now to FIG. 5, an overview of highlight classifier training for a video clip using event modeling is shown according to an embodiment. This classification training can be performed by the highlight learning module 119. As a preliminary step it is assumed that the video clip features 500 have been extracted from the video clip. The video clip features 500 are the sequentially ordered frames in the video, $F_1$-$F_i$. Using the video clip features, events are discovered associated with those video clips using the event models. This produces for the video clip a specific sequence of events $E_1$-$E_{Fi}$. The event models detect the video clip events 510 according to a set of events $E_1$-$E_n$. The events are detected using an event model as described above. Depending on the embodiment, the size of the event model set varies. In one embodiment, the event set comprises thirty events.

As illustrated in FIG. 5, the detected video events are assigned to each of the frames in the video using the event detection of the event models. The video clip events 510 include a list of the events corresponding to the video clip features. In this way, the video clip events 510 represent the video clip in an event space which indicates the video clip's composition of events. The video clip events 510 can be in any detected order, and may repeat sequentially or throughout the whole of the video clip events 510.

Using the detected video clip events 510, statistical analysis is performed to create an event vector 520 to characterize the event frequency and occurrence data of events within the video clip. In one embodiment, the histogram vector includes a unigram event histogram and a bigram event histogram. The unigram event histogram tallies the frequency each individual event occurs within the video clip events 510. That is, the unigram event histogram calculates $E_1$ by tallying the number of times $E_1$ occurs in the video clip events 510. The bigram statistics are also calculated to determine the frequency of event-to-event transitions. For each event pair $(E_i, E_j)$ the bigram statistics determine the number of times the first state immediately precedes the second state. For example, $E_1$ followed by $E_4$ in the video clip events 310 would increment the tally of $(E_1, E_4)$ transitions in the event bigram histogram. The event vector statistics are calculated with reference to the individual video being characterized. This is distinct from the statistics calculated with respect to event modeling calculation and refinement, which were calculated across all event occurrence and transition information for the training set. As shown in this embodiment, the event bigrams include the transition states from an event to itself, for example $(E_1, E_1)$ and more generally $(E_n, E_n)$. In another embodiment, the transition states for an event transition to the same event are not included. These transitions may be excluded in order to reduce the dimensionality of the histogram vector 520, particularly because similar information can be determined from the unigram event histogram. The histograms are combined into the histogram vector 520.

The histogram vector 520 serves as the input to the classifier that makes a video clip highlight determination 530. The histogram vector 520 is also used for training of the highlight classifier. The histogram vectors are determined for the training set of videos by assessing the events within the training set of videos, and then forming a histogram vector on the training set of videos. The highlight classifier is next trained on the histogram vectors for the training set of videos to learn the histogram vectors identified with highlight videos and non-highlight videos. The determination of what constitutes a "highlight" can be determined by a supervised designation, or, for example, by other means. A highlight in one embodiment is a specific type of event in a game, such as a "hit" or an "out" in baseball or a play of over 5 yards in football. A supervised designation could be made by manual assessment of video clips. Automatic detection of a highlight status is performed in one embodiment by associating statistics recorded in-time with the video clips, such as a change in score.

SUMMARY

Using the concept of event decoding within sports videos, the identification of highlight videos is improved. The event detection framework using embedded hidden Markov models enables the detection of complex events including the possibility of varying states within an event. By using these detected events, the classifier is successfully applied to calculated event vectors based on event statistics.

Applications of Highlight Learning

The above-described process, and the classifiers obtained therefrom, have a number of valuable applications.

1) Highlight Labeling of Videos: Using the highlight classifiers trained above, new videos can now be assessed according to its component events, and when classified can be used to identify whether the new video is a highlight video. For videos stored on the video repository, it is often useful to allow users to search for and identify videos of interest. As such, the determination of a sports highlight video is useful for identifying a searchable keyword for the video, and can be used to update a tag associated with the video or to place the video in a category for sports highlights.

2) Identifying Highlight Portions of a Video: Though to this point the length of the videos as a whole has been not considered, video highlights are typically presented as a portion of a much longer video for an entire sporting event. For example, an entire video of a game can be assessed to determine which portions are the highlights. To achieve this, those skilled in the art will realize that the entire video can be broken into individual portions of the video, and the individual portions can be identified as highlights or non-highlights using the trained classifiers, as described above. The portions are determined by splitting the sports video into portions on a static determination such as on a temporal basis, by every 5 or 10 minutes or on the basis of detected shots, such as every 5 or 10 shots. Alternatively, the portions are determined by using a "rolling" portion determination. That is, a "rolling" determination could use a window of a determined length, and use the window to capture portions of the video. For example, a window of a length of 5 minutes could capture a first portion comprising the first 5 minutes, and a second portion comprising minutes 2-6. The identified highlight portions from the video could then be used to identify highlights for a user, or may be concatenated to form a "highlights only" video clip.

While this disclosure relates to methods of identifying highlights in sports videos, the use of low-level feature extraction, event modeling, and event vectors can be used to identify events and classify according to a chosen property for any type of video with a set of recurring events. Since the features are low-level, the techniques do not require timely re-modeling for individual applications. For example, these techniques could be applied to traffic cameras, security cameras, and other types of video to identify recurring events of interest.

The present disclosure has been described in particular detail with respect to one possible embodiment. Those of skill in the art will appreciate that the disclosure may be practiced in other embodiments. First, the particular naming of the components and variables, capitalization of terms, the attributes, data structures, or any other programming or structural aspect is not mandatory or significant, and the mechanisms that implement the disclosure or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present disclosure is intended to be illustrative, but not limiting, of the scope of the disclosure, which is set forth in the following claims.

What is claimed is:

1. A computer-implemented method for identifying a portion of a video as a highlight, comprising:
   accessing a video;
   extracting, from the video, a feature set associated with frames of the video;
   identifying a plurality of video portions of the video, each video portion associated with a subset of frames of the video, and each video portion also associated with a subset of the feature set, wherein the frames of at least one of the video portions overlap with the frames of another one of the video portions;

classifying each video portion using a plurality of highlight classifiers and based on the subset of the feature set associated with that video portion to generate a classification result; and identifying one or more video portions of the plurality of video portions as highlights according to the classification results generated by the highlight classifiers.

2. The computer-implemented method of claim 1, further comprising:

detecting a set of events for each subset of the feature set using a set of event models;

calculating an event vector for each of the set of events detected for each video portion; and wherein classifying each video portion using the plurality of highlight classifiers comprises:

classifying the set of events detected for the video portion using the highlight classifiers and the calculated event vector for the video portion; and wherein identifying one or more video portions of the plurality of video portions as highlights according to the classification result of the highlight classifiers comprises:

identifying one or more sets of events detected for one or more video portions as highlights according to the classification result, the one or more video portions identified as highlights.

3. The computer-implemented method of claim 2, wherein the event models include at least one from a group consisting of hidden Markov models and Gaussian mixture models.

4. The computer-implemented method of claim 2, wherein each event vector is calculated based at least in part on histograms generated for the corresponding detected set of events.

5. The computer-implemented method of claim 4, wherein the histograms used for each event vector include a unigram of event frequency and a bigram of event transitions.

6. The computer-implemented method of claim 1, wherein the feature set extracted from the video includes at least one of: a color histogram, a histogram of oriented gradients, and a histogram of oriented optical flow.

7. A non-transitory computer-readable storage medium having executable program instructions embodied therein, the computer program instructions controlling a computer system to perform a method comprising:

accessing a video;

extracting, from the video, a feature set associated with frames of the video;

identifying a plurality of video portions of the video, each video portion associated with a subset of frames of the video, and each video portion also associated with a subset of the feature set, wherein frames of at least one video portion overlap with frames of another video portion;

classifying each video portion using a plurality of highlight classifiers based on the subset of the feature set identified for each video portion to generate a classification result; and identifying one or more video portions of the plurality of video portions as highlights according to the classification result of the highlight classifiers.

8. The non-transitory computer-readable storage medium of claim 7, the method further comprising:

detecting a set of events for each subset of the feature set using a set of event models;

calculating an event vector for each of the set of events detected for each video portion; and wherein classifying each video portion using the plurality of highlight classifiers comprises:

classifying the set of events detected for the video portion using the highlight classifiers and the calculated event vector for the video portion; and wherein identifying one or more video portions of the plurality of video portions as highlights according to the classification result of the highlight classifiers comprises:

identifying one or more sets of events detected for one or more video portions as highlights according to the classification result, the one or more video portions identified as highlights.

9. The non-transitory computer-readable storage medium of claim 8, wherein the event models include at least one from a group consisting of hidden Markov models and Gaussian mixture models.

10. The non-transitory computer-readable storage medium of claim 8, wherein each event vector is calculated based at least in part on histograms generated for the corresponding detected set of events.

11. The non-transitory computer-readable storage medium of claim 10, wherein the histograms used for each event vector include a unigram of event frequency and a bigram of event transitions.

12. The non-transitory computer-readable storage medium of claim 7, wherein the feature set extracted from the video includes at least one of: a color histogram, a histogram of oriented gradients, and a histogram of oriented optical flow.

13. A computer system comprising:

a computer processor;

a computer-readable storage medium storing data including a computer program which when executed by the computer processor performs the operations of:

accessing a video;

extracting, from the video, a feature set associated with frames of the video;

identifying a plurality of video portions of the video, each video portion associated with a subset of frames of the video, and each video portion also associated with a subset of the feature set, wherein frames of at least one video portion overlap with frames of another video portion;

classifying each video portion using a plurality of highlight classifiers based on the subset of the feature set identified for each video portion to generate a classification result; and identifying one or more video portions of the plurality of video portions as highlights according to the classification result of the highlight classifiers.

14. The system of claim 13, wherein the computer program which when executed by the computer processor further performs the steps of:

detecting a set of events for each subset of the feature set using a set of event models;

calculating an event vector for each of the set of events detected for each video portion; and wherein classifying each video portion using the plurality of highlight classifiers comprises:

classifying the set of events detected for the video portion using the highlight classifiers and the calculated event vector for the video portion; and wherein identifying one or more video portions of the plurality of video portions as highlights according to the classification result of the highlight classifiers comprises:

identifying one or more sets of events detected for one or more video portions as highlights according to the classification result, the one or more video portions identified as highlights.

15. The system of claim 14, wherein the event models include at least one from a group consisting of hidden Markov models and Gaussian mixture models.

16. The system of claim 14, wherein each event vector is calculated based at least in part on histograms generated for the corresponding detected set of events.

17. The system of claim 16, wherein the histograms used for each event vector include a unigram of event frequency and a bigram of event transitions.

18. The method of claim 1, wherein a highlight classifier uses one of a linear support vector machine, logistic regression, or boosting algorithm, and wherein the highlight classifier outputs a score representing a degree to which a video portion indicates a particular highlight.

19. The method of claim 2, wherein events represent coherent patterns of feature data in the video portions.

* * * * *